US011535018B2

(12) United States Patent
Forloni et al.

(10) Patent No.: US 11,535,018 B2
(45) Date of Patent: Dec. 27, 2022

(54) ANTIFOG SEALANT COMPOSITION AND COEXTRUDED MULTILAYER POLYESTER FILM INCLUDING THE SAME

(71) Applicant: Cryovac, LLC, Charlotte, NC (US)

(72) Inventors: Roberto Forloni, Rho (IT); Aida Haxhi, Alessandria (IT)

(73) Assignee: Cryovac, LLC, Charlotte, NC (US)

( * ) Notice: Subject to any disclaimer, the term of this patent is extended or adjusted under 35 U.S.C. 154(b) by 420 days.

(21) Appl. No.: 16/488,074

(22) PCT Filed: Feb. 26, 2018

(86) PCT No.: PCT/EP2018/054679
§ 371 (c)(1),
(2) Date: Aug. 22, 2019

(87) PCT Pub. No.: WO2018/154113
PCT Pub. Date: Aug. 30, 2018

(65) Prior Publication Data
US 2019/0389188 A1    Dec. 26, 2019

(30) Foreign Application Priority Data
Feb. 27, 2017  (EP) .................................. 17158172

(51) Int. Cl.
| | |
|---|---|
| *B32B 27/36* | (2006.01) |
| *B32B 27/08* | (2006.01) |
| *B32B 27/18* | (2006.01) |
| *C08G 63/183* | (2006.01) |
| *C08G 63/199* | (2006.01) |
| *C08K 5/06* | (2006.01) |
| *C08K 5/42* | (2006.01) |
| *C08K 5/54* | (2006.01) |
| *C08L 23/08* | (2006.01) |
| *C08L 67/02* | (2006.01) |
| *B32B 27/32* | (2006.01) |
| *C09D 167/03* | (2006.01) |
| *C09J 123/08* | (2006.01) |
| *C09J 167/03* | (2006.01) |
| *C09D 167/00* | (2006.01) |
| *C09D 123/08* | (2006.01) |
| *C09J 167/00* | (2006.01) |
| *C08L 67/03* | (2006.01) |
| *B65D 65/38* | (2006.01) |
| *B65D 65/40* | (2006.01) |
| *B65D 65/00* | (2006.01) |
| *B65D 65/02* | (2006.01) |

(52) U.S. Cl.
CPC ............. *B32B 27/36* (2013.01); *B32B 27/08* (2013.01); *B32B 27/18* (2013.01); *C08G 63/183* (2013.01); *C08G 63/199* (2013.01); *C08K 5/06* (2013.01); *C08K 5/42* (2013.01); *C08K 5/54* (2013.01); *C08L 23/0815* (2013.01); *C08L 67/02* (2013.01); *B32B 27/32* (2013.01); *B32B 2250/02* (2013.01); *B32B 2250/03* (2013.01); *B32B 2270/00* (2013.01); *B32B 2307/31* (2013.01); *B32B 2307/516* (2013.01); *B32B 2307/518* (2013.01); *B32B 2307/702* (2013.01); *B32B 2307/736* (2013.01); *B32B 2439/06* (2013.01); *B32B 2439/70* (2013.01); *B65D 65/00* (2013.01); *B65D 65/02* (2013.01); *B65D 65/38* (2013.01); *B65D 65/40* (2013.01); *C08G 2190/00* (2013.01); *C08G 2290/00* (2013.01); *C08K 2201/015* (2013.01); *C08L 67/03* (2013.01); *C08L 2203/162* (2013.01); *C08L 2205/025* (2013.01); *C08L 2207/066* (2013.01); *C09D 123/0815* (2013.01); *C09D 167/00* (2013.01); *C09D 167/03* (2013.01); *C09J 123/0815* (2013.01); *C09J 167/00* (2013.01); *C09J 167/03* (2013.01); *Y10T 428/2817* (2015.01); *Y10T 428/31786* (2015.04)

(58) Field of Classification Search
None
See application file for complete search history.

(56) References Cited

U.S. PATENT DOCUMENTS

| | | | |
|---|---|---|---|
| 4,589,247 A | 5/1986 | Tsuruta et al. | |
| 4,841,605 A | 6/1989 | Schuierer | |
| 4,876,146 A * | 10/1989 | Isaka ........................ | B32B 7/02 428/347 |
| 6,706,389 B1 * | 3/2004 | Bates ....................... | B32B 27/36 428/349 |
| 7,211,306 B2 | 5/2007 | Peiffer et al. | |

(Continued)

FOREIGN PATENT DOCUMENTS

| | | | |
|---|---|---|---|
| EP | 0074409 A | * | 3/1983 |
| EP | 1477305 | | 11/2004 |

(Continued)

OTHER PUBLICATIONS

Safety Data Sheet Eastman Eastobond™ Copolyester 19412, issued on Sep. 26, 2018.

(Continued)

*Primary Examiner* — Vivian Chen
(74) *Attorney, Agent, or Firm* — Jason R. Womer

(57) ABSTRACT

The invention relates to a sealant antifog composition for polyester films comprising anionic and non-ionic surfactants in a mixture of amorphous and (semi)crystalline polyesters. The invention also relates to a multi-layer film comprising a sealant layer having the above composition, to the use of said films in food packaging and to the packages obtained therefrom.

18 Claims, No Drawings

(56) References Cited

U.S. PATENT DOCUMENTS

| | | | | |
|---|---|---|---|---|
| 8,129,007 | B2* | 3/2012 | Forloni | B29C 55/143<br>428/34.9 |
| 8,507,084 | B2* | 8/2013 | Deng | C08J 7/043<br>427/412.5 |
| 2002/0186120 | A1* | 12/2002 | Tamura | C08L 67/02<br>338/22 R |
| 2004/0241452 | A1* | 12/2004 | Itaya | B32B 27/18<br>428/423.1 |
| 2007/0212549 | A1* | 9/2007 | Uehara | B32B 27/322<br>428/411.1 |
| 2009/0017245 | A1* | 1/2009 | Forloni | B32B 7/06<br>428/35.7 |
| 2010/0224529 | A1* | 9/2010 | Forloni | B29C 55/12<br>206/524.1 |
| 2012/0045650 | A1* | 2/2012 | Iwazumi | C08J 7/054<br>428/413 |
| 2013/0123404 | A1* | 5/2013 | Tabata | C08K 5/42<br>524/158 |
| 2013/0295218 | A1* | 11/2013 | Hinton | B29C 48/21<br>425/470 |
| 2014/0114003 | A1* | 4/2014 | Yoshimoto | G02B 13/0005<br>524/396 |
| 2014/0234493 | A1* | 8/2014 | Forloni | C09J 7/35<br>426/113 |
| 2019/0337274 | A1* | 11/2019 | Puthanparambil | B32B 27/34 |

FOREIGN PATENT DOCUMENTS

| | | | |
|---|---|---|---|
| EP | 2527142 | | 11/2012 |
| EP | 2599821 | | 6/2013 |
| EP | 2682419 | A * | 1/2014 |
| EP | 2714390 | | 4/2014 |
| EP | 3366471 | | 8/2018 |
| JP | 2014-105299 | A * | 6/2014 |
| WO | 2007093495 | | 8/2007 |
| WO | 2013169375 | | 11/2013 |
| WO | 2014006205 | | 1/2014 |
| WO | WO 2016/083521 | * | 6/2016 |
| WO | 2016148700 | | 9/2016 |

OTHER PUBLICATIONS

Technical Data Sheet Eastman Eastobond™ Copolyester 19412, issued on Feb. 28, 2018.

Additives to Improve Anlifug Performance by NatureWorks LLC, N.P. made available Jan. 18, 2021.

* cited by examiner

ANTIFOG SEALANT COMPOSITION AND COEXTRUDED MULTILAYER POLYESTER FILM INCLUDING THE SAME

TECHNICAL FIELD

The present invention relates to a multilayer film endowed with antifog properties and to its use in packaging, especially of products having a high moisture content.

BACKGROUND ART

Perishable food products such as meat, freshly cooked food, vegetables and the like are commonly packaged in trays of different materials and shapes that are covered at the top by a transparent film, which may be sealed to the tray. Polyester and in particular polyethylene terephthalate (PET) films are commonly used as lidding films. To improve the heat-sealability of the PET lidding film to the container, a heat-sealable layer of a lower melting material is usually provided on the film and on the portion of the container coming in contact with the film. The heat-sealable layer may be coextruded with the PET base layer of the film simultaneously through a single die as described, for example, in EP1529797 and WO2007/093495.

The above packaging system allows the consumer to see the food item on the tray through the plastic wrap. It is therefore important that the transparent film maintains a good see-through quality for consumer inspection throughout the whole shelf-life of the product.

However, a problem often encountered with food items packaged in the above manner is that, upon refrigeration, moisture droplets may condense on the inner surface of the film, especially if the packaged food item has a high moisture content. These droplets may create a "fog" that clouds the surface of the film and obstructs or completely disrupts the view through the film, thus resulting in a negative consumer perception.

To the aim of reducing this negative effect, antifog agents have been used in the preparation of lidding films. These are compounds able to raise the surface tension and thus to prevent the formation of droplets on the surface of the film. As a result, the water on the film forms a continuous layer of water rather than a fog. Several approaches have been tried in order to obtain films having antifog properties by use of these agents.

One approach has consisted in dispersing one or more antifog agents into the plastic film resin during processing. Internal antifog additives are generally surface activators such as non-ionic surfactants, which decrease the surface tension of the water droplets that may form on the film's surface due to condensation. As a result, the surface tension between the water and the substrates surface is reduced. These additives have a certain level of incompatibility with the polymer matrix they are blended into and, as a result, migrate to the surface.

For example, EP2599821 describes polylactic acid based antistatic multilayer sheets, for printed molded articles, in which a layer of the sheet is made of a composition comprising polylactic acid, ionic and non-ionic surfactants. These sheets are endowed with transparency, antistatic, antifog and antiblock properties. In particular, in order to achieve both antistatic and antifog properties, it is taught that the ratio between the ionic surface active agent and the nonionic surface active agent is between 6 and 10.

However, in case of polyester films, it has been shown that these additives do not migrate to the surface in sufficient amount to exert an antifog activity.

Surfactants have been incorporated into polyester based films but with the aim of obtaining an antistatic effect. For example, WO2013/169375 discloses antistatic polyester based films, wherein antistatic properties are obtained by incorporating a combination of an anionic and non-ionic surfactants into a polyester based layer. The polyesters used in the experimental section are semi-crystalline polyesters. However, the amounts of surfactant at the surface of the film are not sufficient to obtain lowering of the surface tension necessary to achieve an antifog effect.

As a consequence of the above, the most common approach to impart antifog properties to polyesters films is to apply an antifog coating directly to the inner surface of the film.

For example WO2014006205, discloses a coextruded biaxially oriented polyester film coated with an antifog composition comprising an antifog additive, a cationic polysaccharide and a diluent.

However, this approach increases the costs of production since it requires an additional coating step. Therefore, a strong need is felt in the art to provide a heat-sealable film having the desired anti fog properties with a simple and cost effective manufacturing method.

SUMMARY OF THE INVENTION

The present inventors have surprisingly found that sealant antifog compositions containing certain amounts of anionic and non-ionic surfactants dispersed in a mixture of amorphous and (semi)crystalline (co)polyesters, when extrusion coated or coextruded to form heat-sealable multilayer packaging films, allow to overcome the problems of surface migration of the antifog agents usually found with polyester films and guarantee excellent antifog properties.

Accordingly, a first object of the present invention is a sealant antifog composition for polyester films comprising
  a1) an anionic surfactant, in an amount of at least 1% by weight,
  a2) a non-ionic surfactant, in an amount of at least 0.5% by weight,
  b) at least one amorphous (co)polyesters in an amount between 10% and 85% by weight,
  c) at least one (semi)crystalline polyester in an amount between 10% and 85% by weight, and
  d) optionally, an ethylene-alpha-olefin copolymer,
wherein component b) and c) are present in a total amount of at least 70% by weight,
all the percentages by weight being referred to the total weight of the composition.

A second object of the present invention is an antifog, optionally oriented, coextruded or extrusion coated heat-sealable multilayer packaging film comprising at least:
  1) a sealant layer consisting of the composition according to the first object of the invention,
  2) a polyester containing layer.

A third object of the present invention is a thermoformed support obtained by thermoforming a film according to the second object of the invention, wherein the sealant layer of film forms the surface of the support that will come into contact with or face a supported product.

A fourth object of the present invention is a flexible container obtained by self-sealing a film according to the second object of the invention or by sealing two films, of which at least one is a film according to the second object of the invention, wherein the sealant layer of the film(s) of the invention faces the inside of the container.

A fifth object of the present invention is a lidded-package comprising a container, for example a support, a product placed on the support, and a lid comprising the film according to the second object of the present invention, wherein the sealant layer of the film is in contact with or faces the product, hermetically sealed all around onto said support, thus enclosing the product.

A sixth object of the present invention is a wrapped package comprising a product, optionally placed on a support, and a film according to the second object of the invention wrapped around said product or around both the product and the support, wherein the sealant layer of the film is in contact with or faces the product.

A seventh object of the present invention is a package comprising a thermoformed support according to the third object of the invention, a product placed in or on the thermoformed container and a lid enclosing the product, wherein the sealant layer of the film is in contact with or faces the product.

An eight object of the present invention is a package comprising a flexible container according to the fourth object of the invention enclosing a product, the latter optionally placed on a support.

A ninth object of the present invention is the use of the film according to the second object of the invention for packaging food.

Definitions

The term "polyester" is used herein to refer to both homo- and co-polyesters, wherein homo-polyesters are defined as polymers obtained from the condensation of one dicarboxylic acid with one diol or of only one hydroxycarboxylic acid or lactone and wherein co-polyesters are defined as polymers obtained from the condensation of at least one dicarboxylic acids with at least two diols or at least two dicarboxylic acids with at least one diol or from the condensation of at least two hydroxyacids or lactones.

Suitable dicarboxylic acids include aromatic, cycloaliphatic and aliphatic di carboxylic acids. Suitable aromatic dicarboxylic acids include terephthalic acid, isophthalic acid, phthalic acid, 2,5-, 2,6- or 2,7-naphthalenedicarboxylic acid, preferably terephthalic acid.

Of the cycloaliphatic dicarboxylic acids, mention should be made of cyclohexanedicarboxylic acids (in particular cyclohexane-1,4-dicarboxylic acid).

Of the aliphatic dicarboxylic acids, the ($C_3$-$C_{19}$)alkanedioic acids are particularly suitable, in particular succinic acid, sebacic acid, adipic acid, azelaic acid, suberic acid or pimelic acid.

Suitable diols or glycols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings.

Homo- or Copolyester resins derived from the condensation of one or more dicarboxylic acid(s) lower alkyl (i.e. up to 14 carbon atoms) diesters with one or more glycol(s), may also be used.

Examples of suitable polyester resins are polyesters of ethylene glycol and terephthalic acid, i.e. poly (ethylene terephthalate) (PET). Preference is given to polyesters that contain ethylene units and include, based on the dicarboxylate units, at least 90 mol %, more preferably at least 95 mol %, of terephthalate units. The remaining monomer units may be selected from other dicarboxylic acids or diols.

Examples of suitable copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid.

As used herein the expression "amorphous" referred to a polyester or a copolyester refers to a polyester or a copolyester with an absence of a regular three-dimensional arrangement of molecules or subunits of molecules extending over distances, which are large relative to atomic dimensions. However, regularity of structure may exist on a local scale (see "Amorphous Polymers" in Encyclopedia of Polymer Science and Engineering, $2^{nd}$ Ed pp 789-842, J. Wiley & Sons Inc 1985). In particular, the term refers to a polyester or copolyester having no measurable melting point (less than 0.5 cal/g) by differential scanning calorimetry (DSC) or no heat of fusion as measured by DSC using for example ASTM 3418. The term also includes polyesters and copolyesters that are obtained and marketed under a (semi) crystalline form but become amorphous after they are heated during extrusion, such as for instance Eastobond 19412 by Eastman Chemical. Suitable amorphous co-polyesters are those derived from an aliphatic diol and a cycloaliphatic diol with one or more, dicarboxylic acid(s), preferably an aromatic dicarboxylic acid. Typical amorphous co-polyesters include co-polyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65.

As used herein the expression "semicrystalline polyester" or "crystalline polyester" refers to a polyester that does not fall within the above definition of amorphous polyester and which has a measurable melting point (measured by DSC according to ASTM 3418).

As used herein the expression "aromatic polyester" refers to homo or copolyesters in which the only or the prevalent dicarboxylic acid is an aromatic dicarboxylic acid as previously defined.

As used herein the term "prevalent" referred to a monomer in a polymer or a component in an admixture relates to a monomer or component present in an amount higher than 50%, 60%, 70%, 80% or 90% by weight with respect to the total weight of the polymer or the admixture respectively.

As used herein the expression "a polyester containing layer" refers to a layer substantially made of polyesters, including homo-, copolyesters as previously defined or their admixtures.

As used herein the expression "a layer substantially made of polyesters" refers to a layer made of at least 80%, 90%, 95%, 98% or more, up to 100% of polyesters.

The phrase "ethylene-alpha-olefin copolymer" as used herein, refers to heterogeneous and to homogeneous polymers such as linear low density polyethylene (LLDPE) with a density usually in the range of from about 0.900 g/cc to about 0.930 g/cc, linear medium density polyethylene (LMDPE) with a density usually in the range of from about 0.930 g/cc to about 0.945 g/cc, and very low and ultra low density polyethylene (VLDPE and ULDPE) with a density lower than about 0.915 g/cc, typically in the range 0.868 to 0.915 g/cc, and such as Maleic Anhydride-Modified Ethylene/Butene Copolymer BYNEL™ resins obtainable from DuPont, metallocene-catalyzed EXACT™ and EXCEED™ homogeneous resins obtainable from Exxon, single-site AFFINITY™ resins obtainable from Dow, and TAFMER™ homogeneous ethylene-alpha-olefin copolymer resins obtainable from Mitsui. All these materials generally include co-polymers of ethylene with one or more co-monomers selected from ($C_4$-$C_{10}$)-alpha-olefin such as butene-1, hexene-1, octene-1, etc., in which the molecules of the copolymers comprise long chains with relatively few side chain branches or cross-linked structures. As used herein, the expression "inner layer" and "internal layer" refer to any film layer having both of its principal surfaces directly adhered to another layer of the film.

As used herein, the expression "outer layer" or "external layer" refers to any film layer having only one of its principal surfaces directly adhered to another layer of the film.

As used herein, the expression "sealant layer", refer to an outer layer involved in the sealing of the film to itself, to another layer of the same or another film, and/or to another article, which is not a film but for instance a container. Heat sealing can be performed by any one or more of a wide variety of manners, such as for example melt bead sealing, thermal sealing, impulse sealing, ultrasonic sealing, hot air, hot wire, infrared radiation etc.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing and extrusion coating processes.

As used herein, the term "extrusion coating" refers to processes by which a "coating" of molten polymer(s), comprising one or more layers, is extruded onto a solid "substrate" in order to coat the substrate with the molten polymer coating to bond the substrate and the coating together, thus obtaining a complete film.

As used herein, the term "orientation" refers to "solid state orientation" namely to the process of stretching of the cast film carried out at a temperature higher than the Tg (glass transition temperatures) of all the resins making up the layers of the structure and lower than the temperature at which all the layers of the structure are in the molten state.

As used herein, the term "support" refers to any object suitable for supporting and possibly containing a product. The support may be flat or hollow. A hollow support is herein named container.

The support may be rigid, semi-rigid or flexible. Suitable examples of supports are, for instance, a tray, a bowl, a dish, a box, a flat support, optionally provided with a sealing area, suitable for being sealed to the sealant layer of the film of the present invention.

As used herein the term "flexible container" refers to a container obtainable by self-annealing a single piece of film in the form of an envelope, a bag or a pouch or by heat sealing two identical or different films, named top and bottom. Bags or pouches include, for example: lay-flat end-seal bags made from a seamless tubing and having an open top, first and second folded side edges, and an end seal across a bottom of the bag; lay-flat side seal bags made from a seamless tubing and having an open top, a folded bottom edge and first and second side seals; lay flat, V-shaped side seal bags made from a seamless tubing and having an open top, a folded bottom edge and first and second side seals, which may be completely angled with respect to the open top, thus providing a triangular bag or partially straight (i.e. perpendicular to the open top) and partially angled, thus providing a trapezium-like shape; lay flat pouches made by heat sealing two flat films to one another, the pouch having an open top, a first side seal, a second side seal and a bottom seal.

As used herein, the term "lid" refers to a cover for closing the opening of a rigid container and/or enclosing a product contained in or supported on a container.

DETAILED DESCRIPTION OF INVENTION

A first object of the present invention is a sealant antifog composition for polyester films comprising
    a1) an anionic surfactant, in an amount of at least 1% by weight,
    a2) a non-ionic surfactant, in an amount of at least 0.5% by weight,
    b) at least one amorphous (co)polyesters in an amount between 10% and 85% by weight,
    c) at least one (semi)crystalline polyester in an amount between 10% and 85% by weight, and
    d) optionally an ethylene-alpha-olefin copolymer,
wherein component b) and c) are present in a total amount of at least 70% by weight, and
all the percentages by weight being referred to the total weight of the composition.

A second object of the present invention is an antifog, optionally oriented, coextruded or extrusion coated heat-sealable multilayer packaging film comprising at least:
    1) a sealant layer consisting of the composition according to the first object of the invention; and
    2) a polyester containing layer.

Accordingly, the second object of the invention is an antifog, optionally oriented, coextruded or extrusion coated heat-sealable multilayer packaging film comprising at least:
    1) a sealant layer comprising:
        a1) an anionic surfactant, in an amount of at least 1% by weight,
        a2) a non-ionic surfactant, in an amount of at least 0.5% by weight,
        b) at least one amorphous (co)polyesters in an amount between 10% and 85% by weight,
        c) at least one (semi)crystalline polyester in an amount between 10% and 85% by weight, and
        d) optionally, an ethylene-alpha-olefin copolymer.
all the percentages by weight being referred to the total weight of the sealant layer, and
    2) a polyester containing layer.

According to a preferred embodiment of the second object of the invention the film optionally also comprises:
    3) one outer polyester containing layer.

The film according to the second object of the invention comprises preferably a number of layers between 2 and 10, more preferably between 2 and 5, even more preferably of 3. In case the number of layers is 4 or more, layer 2 is preferably adhered to layer 1.

When the film according to the second object of the present invention is oriented, it may be mono or biaxially oriented, preferably biaxially oriented.

The film according to the second object of the invention may be heat shrinkable or not, preferably it is heat shrinkable. A heat shrinkable film has a percentage of free shrink at 120° C. of at least 2%, 5%, 10%, 15% in longitudinal and/or transverse direction, measured according to ASTM D 2732.

The total thickness of the final film may vary widely. Preferably, said thickness it is between 10 and 100 microns, preferably between 15 and 50 microns, more preferably between 15 and 30 microns, even more preferably between 15 and 20 microns, even more preferably it is of 17.5 microns.

Preferably, the total thickness of the film is lower than 100, 80, 70, 50, 40, 30, 20 or 10 microns.

Preferably, layer 1 has a thickness between 1 and 30, more preferably between 1 and 20 microns, even more preferably between 1 and 10 microns, even more preferably between 1 and 5 microns, even more preferably between 1.5 and 3.5 microns, even more preferably of about 2 microns.

Preferably, layer 2 has a thickness of between 5 and 70 microns, more preferably between 5 and 60, microns, even more preferably between 5 and 50 microns, even more preferably between 5 and 40, even more preferably between 5 and 30, even more preferably between 5 and 20, even more preferably between 7 and 15 microns, even more preferably between 10 and 15 microns, even more preferably of about 12 or 13.5 microns.

Preferably, the ratio between the thickness of layer 1 and that of layer 2 is between 1:3 and 1:10, more preferably between 1:5 and 1:8, even more preferably between 1:6 and 1:7.

Preferably, layer 3, when present, has a thickness comprised between 1 and 30 microns, more preferably between 1 and 20 microns, even more preferably between 1 and 10 microns, even more preferably between 1 and 5 microns, even more preferably of about 2 or 3.5 microns. Preferably, in the sealant composition according to the first object of the invention or in the sealant layer of the film according to the second object of the invention said anionic surfactant a1) is in an amount, with respect to the total weight of said sealant composition or layer, of at least 1.5%, more preferably of at least 2%, more preferably between 1.5 and 10%, more preferably between 2 and 7%, more preferably between 2 and 6%, even more preferably of about 2.6 or 5.2% and/or it is in an amount, with respect to the total weight of said sealant composition or layer, lower than 8%, 7%, 6%, 5%, 4% or 3%.

Preferably, the anionic surfactant a1) is selected from the group consisting of alkylsulphates, preferably sodium lauryl sulfate, 2-ethylhexylsulfate; polyoxyethylene alkyl ether acetates; alkylsulphonates, preferably sodium dodecylbenenesulfonate; alkyl-aryl phosphates; ether-phosphates; higher alcohol phosphate esters; higher alcohol ethylene oxide adduct phosphate esters, and acyl-N-methyltaurin; carboxylates; sulfosuccinates; alkyl ether sulfonic acids; linear benzenesulfonic acids α-olefinsulfonic; dialkylsulfosuccinic acids, arylsufuric acids; esters of polyoxyethylenealkylphenyl ethersulfuric acids. Particularly preferred anionic surfactants a1) are alkylsulphonates.

Preferably, in the sealant composition according to the first object of the invention or in the sealant layer of the film according to the second object of the invention said non ionic surfactant a2) is in an amount, with respect to the total weight of said sealant composition or layer, of at least 0.75%, preferably at least 1%, more preferably between 0.75% and 6%, more preferably between 1 and 4%, more preferably between 1 and 3%, even more preferably of about 1.4 or 2.8% and/or it is in an amount, with respect to the total weight of said sealant composition or layer, lower than 4%, 3%, 2.5%, 2% or 1%.

Preferably, the non ionic surfactant a2) is selected from the groups consisting of glycol alkyl ethers, glycerol alkyl esters, sorbitan alkyl esters, organosiloxanes, functionalized organosiloxanes, alkyl-substituted pyrrolidone, polyoxyalkylene ethers, ethyleneoxidepropylenenoxide block copolymer. Examples of commercial non ionic surfactants belonging to the above classes are cyclic organosilicons (for example SF1173, SF1256, SF1328, SF1202, SF1258, SF1528 (all from GE Silicones), Dow Corning 245 fluids, dodecamethyl-cyclohexasiloxane) copolymers of polydimethylsiloxane and polyoxyalkylene oxide (for example, SF1488 and SF1288), linear silicones comprising oligomers (for example, Dow Corning 200 ® fluids), Silwet L-7200, Silwet L-7600, Silwet L-7602; Silwet L-7605, Silwet L-7608, Silwet L-7622, non ionic surfactants (for example, Triton X100 (Dow Corning), Igepal CO-630 (Rhodia), PVP series (ISP Technologies), Airvol 125, Airvol 305, Airvol 502 and Airvol 205), and organic polyethers (for examples, Surfynol 420, Surfynol 440 and Surfynol 465 (all from Air Porducts Inc.), or Solsperse 41000 (Avecia). More preferably, the non ionic surfactant is selected from glycol alkyl ethers, glycerol alkyl esters and sorbitan alkyl esters.

Preferably, in the sealant composition according to the first object of the invention or in the sealant layer of the film according to the second object of the invention, the ratio between said anionic surfactant a1) and said non ionic surfactant a2) is lower than 2, more preferably it is between 1 and lower that 2.

According to a preferred embodiment, the sealant composition according to the first object of the invention or the sealant layer of the film according to the second object of the invention also comprises an ethylene-alpha-olefin copolymer. Said ethylene-alpha-olefin copolymer is preferably present in an amount between 5 and 28.5%, more preferably between 10 and 25%, more preferably between 10 and 20%, even more preferably of about 15%, with respect to the total weight of said sealant composition or layer.

Preferably, said ethylene-alpha-olefin is a linear low-density polyethylene (LLDPE), preferably with a density between 0.900 g/cc and 0.930 g/cc, more preferably of about 0.930 g/cc. A suitable LLDPE to be used in the present invention is a maleic anhydride modified ethylene/butene copolymer such as for example Bynel 4104 by Du Pont, having Density 0.93 g/cc (measured by ASTM D792), Melting Point (DSC) 125° C. (257° F.) by ASTM D3418.

According to an alternative embodiment of the invention, the sealant composition according to the first object of the invention or the sealant layer of the film according to the second object of the invention does not comprise an ethylene-alpha-olefin copolymer d). Preferably, when the sealant composition according to the first object of the invention or the sealant layer of the film according to the second object of the invention does not comprise an ethylene-alpha-olefin copolymer d), components b) and c) are present therein in a total amount of at least 90%, more preferably of at least 95%, even more preferably of at least 98%, with respect to the total weight of said sealant composition or layer.

According to a preferred embodiment of the invention, in the sealant composition according to the first object of the invention or the sealant layer of the film according to the second object of the invention said at least one amorphous (co)polyesters b) is present in an amount, with respect to the total weight of said sealant composition or layer, of at least 60%, preferably of at least 65%, more preferably of at least 80%. Preferably, said at least one amorphous (co)polyesters b) is present in an amount is between 60 and 85%.

According to an alternative preferred embodiment of invention, in the sealant composition according to the first object of the invention or the sealant layer of the film according to the second object of the invention, said at least one (semi)crystalline polyester c) is present, with respect to the total weight of said sealant composition or layer, in an amount of at least 60%, preferably of at least 65%, more preferably of at least 80%. Preferably, said at least one (semi)crystalline polyester c) is present in an amount is between 60 and 85%.

Preferred sealant compositions according to the first object of the invention or sealant layers of the film according to the second object of the invention are those that comprise between 60 and 85% of at least one amorphous (co)polyesters b) and between 10 and 35% of at least one (semi)crystalline polyester c) or between 60 and 85% of at least one (semi)crystalline polyester c) and between 10 and 35% of at least one amorphous (co)polyesters b).

Preferably, the sealant composition according to the first object of the invention or the sealant layer of the film according to the second object of the invention, does not contain any other polymer in addition to component b) and c) and, when present, an ethylene-alpha-olefin copolymer d).

Preferably, in the sealant composition according to the first object of the invention or the sealant layer of the film according to the second object of the invention said amorphous (co)polyesters b) and (semi)crystalline polyester c) in the sealant composition according to the first object of the invention or in the sealant layer of the film according to the second object of the invention, consist for at least 45%, 50%, 55%, 60%, 65%, 70%, 75%, 80%, 90%, 95% or 100% of aromatic polyesters and (co)polyesters, preferably homo or copolyesters in which the only or the prevalent dicarboxylic acid is terephtalic acid. According to a preferred embodiment, in the sealant composition according to the first object of the invention or in the sealant layer of the film according to the second object of the invention, said amorphous (co)polyester b) is a poly(ethylene terephthalate) copolymer. The latter may be in an amorphous form, like Eastobond 19411 by Eastman Chemical or a poly(ethylene terephthalate) copolymer in (semi)crystalline form before extrusion but that becomes amorphous when it is heated, such as during extrusion. An example of a suitable poly(ethylene terephthalate) copolymer that becomes amorphous after extrusion is Eastobond 19412 by Eastman Chemical.

According to a particularly preferred embodiment, said amorphous (co)polyester b) is a co-polyester of terephthalic acid with an aliphatic diol and a cycloaliphatic diol, especially ethylene glycol and 1,4-cyclohexanedimethanol, like PETG Eastar® 6763 sold by Eastman Chemical, which comprises a copolyester of terephthalic acid, about 33 mole % 1,4-cyclohexane dimethanol and about 67 mole % ethylene glycol and which has a glass transition temperature Tg of 81° C. GN001 by Eastman Chemical can also be used (Density 1.27 g/cc, Glass Transition 81° C., Viscosity Solution 0.75 mPa·sec).

According to a preferred embodiment, in the sealant composition according to the first object of the invention or in the sealant layer of the film according to the second object of the invention, said (semi)crystalline polyester c) is poly(ethylene terephthalate) (PET). An example of suitable (semi)crystalline PET is RAMAPET N180 by Indorama or Eastapack copolyester 9921 by Eastman Chemical.

In the sealant composition according to the first object of the invention or in the sealant layer of the film according to the second object of the invention, components a1), a2), and b) or c) can derive from a masterbatch wherein a mixture in appropriate proportions of surfactants a1) and a2) are already dispersed in a semi crystalline or amorphous (co)polyester or in an admixture thereof. For Example, the following masterbatches may be used: ELECUT S618-A1 from Takemoto Oil and Fat, which contains 13% of an alkylsulphonate and 7% of a non ionic surfactant dispersed in (semi)crystalline PET, or ELECUT S-617G-20 from Takemoto Oil and Fat, which contains 13% of an alkylsulphonate and 7% of a non ionic surfactant dispersed in an amorphous co-polyester of terephthalic acid.

The polyester containing layer 2) of the film according to the second object of the invention comprises a (semi)crystalline polyester in an amount, with respect to the total weight of layer 2), of 0 to 100%, preferably of at least of 50%, more preferably between 50 and 80%, even more preferably between 55% and 70%, even more preferably of about 60% and an amorphous (co)polyester in an amount, with respect to the total weight of layer 2), between 0 and 100%, preferably between 10 and 50%, more preferably between 20 and 50%, more preferably between 30 and 45%, even more preferably of about 40%.

According to a preferred embodiment of the invention, said layer comprises between 50% and 80% of a (semi)crystalline polyester and preferably between 20 and 50% of an amorphous (co)polyester. Suitable amorphous (co)polyesters are EASTAR PETG 6763 by Eastman Chemical and GN001 by Eastman Chemical. A suitable (semi)crystalline polyester is EASTAPAK COPOLYESTER 9921 by Eastman Chemical and RAMAPET N180 by Indorama.

Preferably, the polyester containing outer layer 3) of the film according to the second object of the invention, contains a (semi)crystalline polyester in an amount, with respect to the total weight of layer 3), of at least 80%, 90%, 95%, 98%, 99% or 100%, more preferably in an amount of about 98%. Suitable (semi)crystalline polyester are EASTAPAK COPOLYESTER 9921 by Eastman Chemical and RAMAPET N180 by Indorama. Preferably, layer 3 also contains an amorphous (co)polyester, preferably in an amount, with respect to the total weight of layer 3), lower than 5%, 4%, 3%, 2.5%, 2%, 1%, more preferably of about 2%.

The film according to the second object of the present invention may be manufactured according to processes well known in the art such as flat or round co-extrusion, optionally followed by mono- or bi-orientation, performed by flat, sequential or simultaneous tenterframe orientation or by trapped bubble orientation on Double or Triple Bubble lines, respectively.

Preferably, such process comprises:
  a) co-extrusion or extrusion coating to obtain a multilayer tape or tube,
  b) optionally, orientation, in at least one of the machine (MD) or transverse directions (TD), preferably in both, with an orientation ratio preferably comprised between about 2:1 and about 5:1 in each direction, said orientation step being optionally followed by a heat-setting step.

Preferably, coextrusion or extrusion coating are carried out by means well known in the art, for example using a flat or a circular film die that allows shaping the polymer melt into a flat tape or a film tubing. In case of coextrusion, each of the blends of the polyester composition of the sealing layer 1), of the polyester containing layer 2) and, when present, of the outer polyester containing layer 3) are extruded simultaneously through an extrusion die.

In case of extrusion coating a substrate, consisting at least of the polyester containing layer 2), optionally including also the outer polyester containing layer 3), is coated with the sealing layer 1) according to conventional coating techniques The film of the present invention, co-extruded or extrusion coated as described above, is, optionally, oriented through a round or flat film orientation process that produces a monoaxially, preferably biaxially oriented film.

In details, in case the multilayer film is co-extruded or extrusion coated through a circular extrusion die, the tube of molten polymers so obtained is quenched immediately after extrusion without being expanded, optionally cross-linked, then heated to a temperature which is above the Tg of all the resins employed and below the melting temperature of at least one of the resins employed, typically by passing it through a hot water bath or heating it with an IR oven or with hot air, and expanded, still at this temperature by internal air pressure to get the transverse orientation and by a differential speed of the pinch rolls which hold the thus obtained "trapped bubble" to provide the machine or longitudinal orientation. An example of equipment suitable for this technique is disclosed by U.S. Pat. No. 4,841,605.

Otherwise, the multilayer film according to the present invention may be obtained by flat coextrusion through a slot die, followed by optional orientation by heating the tape to its softening temperature but below its melt temperature and by stretching in the solid state with a simultaneous or a sequential tenterframe process. The film is then rapidly cooled to somehow freeze the molecules of the film in their oriented state and wound.

Furthermore, in some instances it may be desirable to submit the oriented structure to a controlled heating-cooling treatment, so-called annealing, that is aimed at having a better control on low temperature dimensional stability of the heat-shrinkable film.

In case of oriented films, while orientation is typically carried out in both machine and transverse directions, monooriented films or preferentially oriented films can be obtained by avoiding or controlling transverse or machine orientation.

Typical solid state orientation ratios for the films of the present invention can be from 2:1 to 6:1 in each direction (MD and TD), or from 3:1 to 5:1 in each direction, or from 3:1 to 4.5:1 in each direction. Typical orientation temperatures for the present films range from 90° to 180° C., more preferably from 95° to 120° C.

Typical heat setting temperatures for the present films range from 120° C. to 220° C., preferably between 180° C. and 210° C.

A third object of the present invention is a thermoformed support obtained by thermoforming a film according to the second object of the invention. In the thermoformed support, the sealant layer of the film(s) of the invention forms the surface of the support that will come into contact with or face a supported product.

Thermoforming is well known in the art, for example, it is described in Modern Plastic Encyclopedia, 1984-1985, at pages 329-336.

In general, in thermoforming a film, in the form of a flat sheet, is heated until the thermoplastic material is sufficiently softened and the sheet is then placed over a mould, typically made of alluminium. The heated film is then forced towards the surface of the mould by vacuum, air pressure and/or direct mechanical force, so that it assumes the shape of the mould. The sheet is then cooled while being held against the mould and thus originates a thermoformed shaped product which is ejected from the mould, A fourth object of the present invention is a flexible container obtained by self-sealing a film according to the second object of the invention or by sealing two films, of which at least one is a film according to the second object of the invention, wherein the sealant layer of the film(s) of the invention faces the inside of the container.

Preferably, the flexible container is in the form of a bag or a pouch.

Any conventional method for making bags and pouches known in the art may be readily adapted to make flexible containers from the multilayer film according to the present invention.

A fifth object of the present invention is a package comprising a support, a product placed on the support, and a lid comprising the film according to the second object of the present invention, wherein the sealant layer of the film faces the product, hermetically sealed all around onto said support, thus enclosing the product.

In tray lidding applications, the film is sealed onto a continuous peripheral rim extending all around the container.

Typically, the surface of the support in contact with the product, i.e. the surface involved in the formation of the seal with the lidding film, comprises a polyester resin, usually an amorphous polyester resin. For instance, the container can be made of cardboard coated with polyester or it can be integrally made of a polyester resin. Examples of suitable supports for the package of the invention are CPET, APET, APET/CPET, either foamed or not-foamed, i.e. solid.

The support can be pre-made or thermoformed, preferably in line. According to a preferred embodiment, the support is thermoformed, preferably, it is a thermoformed support comprising the film of the invention according to the third object of the invention.

The package is produced by techniques well known to those skilled in the art.

For example, once the food to be packaged has been placed on the support, the film according to the second object of the invention is sealed to the support by means of temperature and/or pressure using conventional techniques and equipment.

In particular, the support with the product loaded therein is brought into a lid sealing station, which comprises a lower chamber and an upper chamber, and a web of the film of the invention is provided over the top of the tray. The lower chamber and the upper chamber are then closed together, the air in-between the support and the lidding film is replaced by the suitable gas or gas admixture, with or without prior air evacuation, and then the lidding film of the invention is sealed to the rim or the peripheral lip of the support by means of the combination of a heated frame or platen above the lidding film and a similarly framed anvil supporting the tray rim or peripheral lip, that are pressed together. The lidding film is cut almost at the same time as the lid is sealed and, in case of shrinkable lids, shrinkage of the lid in the package typically occurs at the same time as the heat of the sealing elements in the lidding station is sufficient to get the desired shrinkage. However, a further heat shrinking step may be added in case of need. Lidding machines that can be suitable for tray lidding process include for instance Multivac 400 and Multivac T550 by Multivac Sep. GmbH, Mondini Trave, E380, E390 or E590 by Mondini S.p.A., Ross A20 or Ross S45 by Ross-Reiser, Meca-2002 or Meca-2003 by Mecaplastic, the tray lidding machines of Sealpac and the like machines.

The film of the present invention is placed onto the support such that the heat-sealable layer 1) faces the product. The film can be unwound from a roll or provided in form of pre-cut pieces of the right shape and dimensions (billets). Sealing is carried out by means of a heated frame, preferably at temperatures of from 100° C. to 200° C., from 120° C. to 200° C., from 140° C. to 200° C., from 160° C. to 200° C. at a pressure of 2 to 10 bar, 4 to 8 bar. Sealing times are typically in the order of 0.3 to 2.0 seconds, 0.5 to 1.0 seconds. The heat generated by the sealing frame provides for a taut hermetically sealed lid.

Optionally, heat sealing is carried out by applying a modified atmosphere between said lid and said support or under vacuum, depending on the specific needs of the product packaged therein.

A sixth object of the present invention is a wrapped package comprising a product, optionally placed on a support, and a film according to the second object of the invention wrapped around said product or around both the product and the support, wherein the sealant layer of the film is in contact with or faces the product.

Preferably, said package is hermetic. In said hermetic package, the film is sealed to itself. Preferably, the film in said hermetic package is sealed to itself along a longitudinal seal and two transverse seals, to give a pouch.

For instance, a wrapped hermetic package can be obtained by a flowpack packaging method by means of a Horizontal Form-Fill-Seal (HFFS) machine.

In details, such method conventionally comprises:
a) providing the film according to the present invention,
b) running the film through a former thus forming a tube,
c) inserting a product, optionally placed in a container or onto a support, into the tube,
d) sealing the tube longitudinally,
e) sealing and cutting the tube transversally at the beginning and at the end of the package, optionally gas-flushing or vacuumizing the tube before closing it, and
f) optionally, heat shrinking the package.

In a flowpack packaging method, the product, typically in a tray, is wrapped into an envelope made from a film of the present invention, preferably under a suitable and predetermined atmosphere. To create the envelope, the flat film is first folded around a former and longitudinally sealed to form a tube. The tray with the product is placed in such a tube where the leading edge has been closed and gas flushed with the suitably selected gas or gas mixture. The excess gas is generally removed by a gentle pressure on top of the package and the open end of the envelope is then sealed and the package separated from the tubing. In case of a shrinkable film, the loose package is then passed into a shrink tunnel, typically a hot air one set at a temperature suitable for shrinking such as a temperature of 100-150° C., to get shrinkage of the film and thus a tight package.

As an alternative, pouches can be made with Vertical Form Fili Seal (VFFS) packaging systems that have proven to be very useful in packaging a wide variety of flowable products. The VFFS process is known to those of skilled in the art, and described for instance in U.S. Pat. No. 4,589,247. A flowable product is introduced through a central, vertical fill tube to a formed tubular film of the invention having been sealed transversely at its lower end, and longitudinally. The pouch is then completed by sealing the upper end of the tubular segment, and severing the pouch from the tubular film above it.

A FFS machine, either Horizontal or Vertical, typically includes a former for forming a flat web of film into a tubular configuration, a longitudinal sealer to seal the overlapped longitudinal edges of the film in the tubular configuration, a conveyor for feeding the products into the tubular film one after the other in suitably spaced configuration, or a feeding tube for soft, fluid or powder products in case of a VFFS machine, and a transverse sealer for sealing the tubular film in a cross-wise direction to separate the products into discrete packages.

Suitable machines for the flowpack process include Ilapak Delta 2000 and 3000 or Ulma Baltic, Artic or Pacific.

A seventh object of the present invention is a package comprising a thermoformed support according to the third object of the invention, a product placed in or on the thermoformed container and a lid enclosing the product, wherein the sealant layer of the film of the thermoformed support is in contact with or faces the product.

This package may be formed for example by placing a product in or on the thermoformed support obtained as described above and disposing a second, substantially non-forming web over the product. At a sealing station, the packages are vacuumized and sealed with a sealing device such as a heated jaw.

In the present support, the sealant layer of the film is directed toward the product.

In a preferred embodiment, both the non-forming webs that form the lid of the support comprises a film according to the present invention. In such a case both the sealant layer of the forming and of the non-forming webs are directed toward the product. Alternatively, the non-forming webs that form the lid of the container does not comprise a film according to the present invention.

An eight object of the present invention is a package comprising a flexible container according to the fourth object of the invention enclosing a product, the latter optionally placed on a support.

For example, in packaging, the product may be loaded into a heat-shrinkable bag made of the film of the invention, the bag will normally be evacuated, and the open end thereof will be closed by heat-sealing or by applying a clip, e.g. of metal. This process is advantageously carried out within a vacuum chamber where the evacuation and application of the clip or heat seal is done automatically. After the bag is removed from the chamber, it is heat shrunk by applying heat. This can be done, for instance, by immersing the filled bag into a hot water bath or conveying it through a hot water shower or a hot air tunnel, or by infrared radiation. The heat treatment will produce a tight wrapping that will closely conform to the contour of the product therein packaged.

Alternatively, the product may be packaged by means of flexible containers e.g. pouches made on form-fill-seal machines, such as a Horizontal Form-Fill-Seal (HFFS) or a Vertical Form-Fill Seal (VFFS) machine.

In the packages according to the present invention, the product is preferably a food product, preferably a fog developing food product such as fruits, vegetables, meat and cheese.

The packages according to the present invention described above are particularly suitable for use with ready-prepared foods, so-called "ready-meals", which are intended to be warmed in a microwave oven or in any other type of oven, such as a conventional convection oven, a direct radiation oven and a forced hot air oven.

Furthermore, the packages according to the present invention described above are particularly suitable for packaging moist or respiring food products such as fruits, vegetables, meat and cheese, namely products, especially food products, which tend to release water and to fog the package.

A ninth object of the present invention is the use of the film according to the second object of the present invention for packaging food, preferably for cooking applications (either in microwave oven or in conventional oven) such as ready meals, or for packaging moist or respiring products.

EXAMPLES

The present invention can be further understood by reference to the following examples that are merely illustrative and are not to be interpreted as a limitation to the scope of the present invention that is defined by the appended claims.

In the following examples, the polymers and coatings indicated in Table 1 below have been employed:

TABLE 1

| Tradename | Supplier | Chemical Nature | Acronym | Properties and parameters |
|---|---|---|---|---|
| Eastobond 19412 | Eastman Chemical | Polyester, copolymer of polyethylene terephtalate | PET1 | Density 1.33 g/cc, Intrisic Viscosity 0.74 dl/g Amorphous after extrusion |
| EASTAPAK COPOLYESTER 9921 | Eastman Chemical | Polyester, copolymer of polyethylene terephtalate | PET2 | Density 14.000 g/cc, Melting Point 255.0° C., Intrisic Viscosity 0.8 dl/g (Semi)crystalline |
| RAMAPET N180 | Indorama | Polyethylene Terephthalate | PET3 | Density 1.4 g/cc, Glass Transition 78° C., Melting Point 245° C., Viscosity Solution 0.80 mPa · sec (Semi)crystalline |
| BYNEL 4104 (2006) | DuPont | Maleic Anhydride-Modified Ethylene/Butene Copolymer - | LLDPE-md | Density 0.9300 g/cc, Vicat Softening point 110° C., Melting Point 125.0° C., Melt Flow Rate (Cond. 190° C./ 02.16 kg) 1.10 g/10 min |
| SUKANO G dc S503 | Sukano | AntiBlock and Slip in Polyethylene Terephthalate/Glycol - Amorphous Silica and Ester Wax | PETG1 | Additives (SiO2) 10%, Additives (Wax) 6%, Bulk (Apparent) Density 0.74 g/cc Density 1.4 g/cc, Moisture Content max 0.5%, Vicat softening point 82° C. Amorphous |
| EASTAR PETG 6763 | Eastman Chemical | Polyethylene Terephthalate/Glycol (copolyester of terephthalic acid, about 33 mole % 1,4-cyclohexane dimethanol and about 67 mole % ethylene glycol) | PETG2 | Density 1.27 g/cc, Melt Flow Rate (Cond. 200° C./05.00 kg (G) 2.8 g/10 min, Glass Transition 80° C., Intrinsic Viscosity 0.75 dl/g, Vicat softening point 85° C. Amorphous |
| GN001 | Eastman Chemical | Polyethylene Terephthalate/Glycol - | PETG3 | Density 1.27 g/cc, Glass Transition 78° C., Intrinsic Viscosity 0.75 dl/g Amorphous |
| Elecut S-618-A1 | Takemoto Oil & Fat | Polyethylene Terephthalate containing 13% alkyl sulphonates and 7% non-ionic surfactants | MB1 | (Semi)crystalline |
| Elecut S-617G-20 | Takemoto Oil & Fat | Polyethylene Terephthalate/Glycol modified containing 13% alkyl sulphonates and 7% non-ionic surfactants | MB2 | Amorphous |

Antifog, multilayer, heat shrinkable films were prepared having the composition in layers indicated in Tables 2 and 3 below.

TABLE 2

Examples

| Ex. No. | Layer | Thickness (microns) | Layer composition |
|---|---|---|---|
| EX. 1 | Sealant Layer 1 | 2.0 | 80% PET1, 20% MB1 |
| | Inner Layer 2 | 13.5 | 60% PET2, 40% PETG3 |
| | Outer Layer 3 | 2.0 | 98% PET2, 2% PETG1 |
| EX. 2 | Sealant Layer 1 | 2.0 | 60% PET1, 40% MB1 |
| | Inner Layer 2 | 13.5 | 60% PET2, 40% PETG3 |
| | Outer Layer 3 | 2.0 | 98% PET2, 2% PETG1 |
| EX. 3 | Sealant Layer 1 | 2.0 | 65%PETG2, 15% LLDPE-md, 20% MB1 |
| | Inner Layer 2 | 13.5 | 60% PET3, 40% PETG2 |
| | Outer Layer 3 | 2.0 | 98% PET3, 2% PETG1 |
| EX. 4 | Sealant Layer 1 | 2.0 | 80% PETG2, 20% MB1 |
| | Inner Layer 2 | 13.5 | 60% PET3, 40% PETG2 |
| | Outer Layer 3 | 2.0 | 98% PET3, 2% PETG1 |
| EX. 5 | Sealant Layer 1 | 2.0 | 80% PETG3, 20% MB1 |
| | Inner Layer 2 | 12 | 60% PET3, 40% PETG3 |
| | Outer Layer 3 | 3.5 | 98% PET3, 2% PETG1 |
| EX. 6 | Sealant Layer 1 | 2.0 | 80% PET3, 20% MB2 |
| | Inner Layer 2 | 12 | 60% PET3, 40% PETG3 |
| | Outer Layer 3 | 3.5 | 98% PET3, 2% PETG1 |

TABLE 3

Comparative Examples

| Ex. No. | Layer | Thickness | Layer composition |
|---|---|---|---|
| COMP 1 | Sealant Layer 1 | 2.0 | 85% PETG2/PETG3, 15% LLDPE-md |
| | Inner Layer 2 | 12 | 60% PET3, 40% PETG2/PETG3 |
| | Outer Layer 3 | 3.5 | 98% PET3, 2% PETG1 |

TABLE 3-continued

Comparative Examples

| Ex. No. | Layer | Thickness | Layer composition |
|---|---|---|---|
| COMP 2 | Sealant Layer 1 | 2.0 | 75% PETG2, 15% LLDPE-md, 10% MB1 |
| | Inner Layer 2 | 13.5 | 60% PET3, 40% PETG2 |
| | Outer Layer 3 | 2.0 | 98% PET3, 2% PETG1 |
| COMP 3 | Sealant Layer 1 | 2.0 | 80% PETG2, 20% MB2 |
| | Inner Layer 2 | 13.5 | 60% PET3, 40% PETG2 |
| | Outer Layer 3 | 2.0 | 98% PET3, 2% PETG1 |
| COMP 4 | Sealant Layer 1 | 2.0 | 80% PET3, 20% MB1 |
| | Inner Layer 2 | 12 | 60% PET3, 40% PETG3 |
| | Outer Layer 3 | 3.5 | 98% PET3, 2% PETG1 |

All the films described above were manufactured through a Flat Coextrusion process followed by in-line simultaneous Tenterframe orientation. The main operating conditions used to stretch and heat-set the films are summarized here below:
Machine Direction MD ratio: 3.4:1;
Transverse Direction TD ratio: 3.3:1;
Pre-heating temperature: 101° C.;
Stretching Temperature: 99° C.;
Heat-setting Temperature: 200° C.

The films so obtained were cooled down first by an air flow at 30° C. and then by passing onto a cooling roll that was cooled with water and kept at 20° C.

Antifog Test (Score)

A packaging film is defined as "antifog" if its internal surface allows the droplets of water to lay as a smooth and uniform layer allowing visual inspection of the packaged product.

An internal test method was used to evaluate the antifog performance of the films of Examples 1-6 and Comparative Examples 1-4.

In details, 250 ml of water were placed in a 900 ml glass vessel. The film was then secured through a rubber band tightly over the vessel; the sealant side of the film was placed towards the water without being into contact with the liquid. The vessel was then placed in a refrigerated cooler at 2-4° C. Three samples were prepared for each film.

The specimens so prepared were then observed after 24 hours or after 1, 3, 6 and 24 and scored by three panellists according to the following rating scale, ordered from very poor to excellent antifog properties:
score 1-very poor: opaque layer of small fog droplets;
score 2-poor: opaque or transparent layer of large droplets;
score 3-acceptable: complete layer of large transparent droplets;
score 4-good: randomly distributed or large transparent droplets;
score 5-excellent: transparent film without visible water.

The final antifog score is the average of the ratings given by the three-panellists. The result of the test performed for each film are reported in Table 4.

TABLE 4

Antifog scores

| Sample | Score at 1 hour | Score at 3 hours | Score at 6 hours | Score at 24 hours |
|---|---|---|---|---|
| Ex 1 | | | | 4.5/5 |
| Ex 2 | | | | 4.5/5 |
| Ex 3 | | | | 4.5 |
| Ex 4 | | | | 4.5 |
| Ex 5 | 4 | 4 | 4 | 4 |
| Ex 6 | 3.5 | 3.5 | 4 | 4 |
| Comp 1 | | | | 1 |
| Comp 2 | | | | 1.5 |
| Comp 3 | | | | 2/2.5 |
| Comp 4 | 2.5 | 2.5 | 2 | 2 |

The above results shows that the films according to the invention have very good antifog properties that are not found in the comparative films. In particular, the examples demonstrate that, in order to obtain migration of the surfactants to the surface of the film and optimal antifog properties, it is necessary that surfactants are dispersed into a sealant layer that contains a mixture of an amorphous (co)polyester and of a (semi)crystalline polyester, with specific weight ratios between the two components.

The invention claimed is:

1. A sealant antifog composition for polyester films comprising
   a1) an anionic surfactant, in an amount of at least 1% by weight,
   a2) a non-ionic surfactant, in an amount of at least 0.5% by weight,
   b) at least one amorphous (co)polyesters in an amount between 10% and 85% by weight,
   c) at least one (semi)crystalline polyester in an amount between 10% and 85% by weight, and
   wherein component b) and c) are present in a total amount of at least 70% by weight, all the percentages by weight being referred to the total weight of the composition.

2. The sealant antifog composition according to claim 1, wherein said anionic surfactant a1) is in an amount, with respect to the total weight of the composition, of at least 1.5%, and less than 8% and said non ionic surfactant a2) is in an amount, with respect to the total weight of the composition, of between 1 and 3%, the ratio between said anionic surfactant a1) and said non ionic surfactant a2) is lower than 2.

3. The sealant antifog composition according to claim 1, wherein said anionic surfactant a1) is selected from the group consisting of: sodium lauryl sulfate; 2-ethylhexylsulfate; polyoxyethylene alkyl ether acetates; alkylsulphonates; sodium dodecylbenenzesulfonate; alkyl-aryl phosphates; ether-phosphates; phosphate esters; ethylene oxide adduct phosphate esters; and acyl-N-methyltaurin; sulfosuccinates; alkyl ether sulfonic acids; linear benzenesulfonic acids; α-olefinsulfonic acids; dialkylsulfosuccinic acids; arylsulfonic acids; esters of polyoxyethylenealkylphenyl; and ether-sulfuric acids; and a2) is selected from the group consisting of: glycol alkyl ethers; glycerol alkyl esters; sorbitan alkyl esters; organosiloxanes; functionalized organosiloxanes; alkyl-substituted pyrrolidone; polyoxyalkylene ethers; and ethyleneoxidepropylenenoxide block copolymer.

4. The sealant antifog composition according to claim 1, wherein said at least one amorphous (co)polyesters b) is present in an amount, with respect to the total weight of the composition, of at least 60% or said at least one (semi)crystalline polyester c) is present in an amount, with respect to the total weight of the composition, of at least 60%.

5. The sealant antifog composition according to claim 1, which comprises between 60 and 85% of at least one amorphous (co)polyesters b) and between 10 and 35% of at least one (semi)crystalline polyester c) or between 60 and 85% of at least one (semi)crystalline polyester c) and between 10 and 35% of at least one amorphous (co)polyesters b).

6. The sealant antifog composition according to claim 1, wherein the composition comprises an ethylene-alpha-olefin copolymer, an amount between 5 and 28.5 and said ethylene-alpha-olefin is a linear low density polyethylene (LLDPE) with a density between 0.900 g/cc and 0.930 g/cc as measured by ASTM D792.

7. The sealant antifog composition according to claim 1, wherein component b) and c) total to include at least 45% by weight of aromatic polyesters and (co)polyesters in which the only or the prevalent dicarboxylic acid is terephtalic acid and said amorphous (co)polyester b) is a poly(ethylene terephthalate) copolymer or is a co-polyester of terephthalic acid with an aliphatic diol and a cycloaliphatic diol and said (semi)crystalline polyester c) is poly(ethylene terephthalate) (PET); percentages by weight being referred to the total weight of the composition.

8. The sealant antifog composition according to claim 1 further comprising d) an ethylene-alpha-olefin copolymer.

9. The sealant antifog composition according to claim 8, wherein the composition does not comprise an ethylene-alpha-olefin copolymer d) and components b) and c) are present in a total amount of at least 90% with respect to the total weight of said sealant composition.

10. An antifog heat-sealable multilayer packaging film comprising at least:
1) A sealant layer consisting of
a1) an anionic surfactant, in an amount of at least 1% by weight,
a2) a non-ionic surfactant, in an amount of at least 0.5% by weight,
b) at least one amorphous (co)polyesters in an amount between 10% and 85% by weight,
c) at least one (semi)crystalline polyester in an amount between 10% and 85% by weight, and
wherein component b) and c) are present in a total amount of at least 70% by weight,
all the percentages by weight being referred to the total weight of the composition; and
d) optionally an ethylene-alpha-olefin copolymer,
2) a polyester containing layer, and
3) an outer polyester containing layer.

11. The film according to claim 10, having a number of layers between 2 and 10.

12. The film according to claim 10, which is mono oriented and is heat shrinkable.

13. The film according to claim 10, wherein any of i) the total thickness of the film is between 10 and 100 microns; and a first layer has a thickness between 1 and 30 microns; and a second layer has a thickness of between 5 and 70 microns; or ii) the ratio between the thickness of the first layer and that of the second layer is between 1:3 and 1:10 or iii) both i) and ii).

14. The film according to claim 10, wherein the film is oriented.

15. The film according to claim 10, wherein the film is a coextruded film.

16. The film according to claim 10, wherein the film is biaxially oriented and is heat shrinkable.

17. A wrapped package comprising a product, placed on a support and a film wrapped around said product or around both the product and the support, wherein the sealant layer of the film is in contact with or faces the product,
wherein the film is an antifog heat-sealable multilayer packaging film comprising at least:
1) A sealant layer consisting of
a1) an anionic surfactant, in an amount of at least 1% by weight,
a2) a non-ionic surfactant, in an amount of at least 0.5% by weight,
b) at least one amorphous (co)polyesters in an amount between 10% and 85% by weight,
c) at least one (semi)crystalline polyester in an amount between 10% and 85% by weight, and
d) optionally an ethylene-alpha-olefin copolymer,
wherein component b) and c) are present in a total amount of at least 70% by weight,
all the percentages by weight being referred to the total weight of the composition; and
2) A polyester containing layer.

18. The wrapped package according to claim 17, wherein the multilayer packaging film further comprises 3) an outer polyester containing layer.

* * * * *